United States Patent
Humfeldt et al.

(10) Patent No.: US 8,528,887 B2
(45) Date of Patent: Sep. 10, 2013

(54) HOLDER FOR FASTENING AN INTERIOR COMPONENT, INTENDED FOR MOUNTING IN AN AIRCRAFT, TO A TRANSPORTING APPARATUS

(75) Inventors: Dirk Humfeldt, Hamburg (DE); Thomas Basler, Jena (DE); Sebastian Umlauft, Hamburg (DE)

(73) Assignee: Airbus Deutschland GmbH (DE)

( * ) Notice: Subject to any disclaimer, the term of this patent is extended or adjusted under 35 U.S.C. 154(b) by 512 days.

(21) Appl. No.: 12/790,277

(22) Filed: May 28, 2010

(65) Prior Publication Data

US 2010/0301537 A1 Dec. 2, 2010

Related U.S. Application Data (60) Provisional application No. 61/182,310, filed on May 29, 2009.

(30) Foreign Application Priority Data

May 29, 2009 (DE) .......................... 10 2009 023 401

(51) Int. Cl.
*B23Q 1/00* (2006.01)
*B25B 5/16* (2006.01)

(52) U.S. Cl.
USPC ............................................ 269/51; 269/291

(58) Field of Classification Search
USPC ........... 269/55, 60, 58, 289 R, 291; 29/281.1
See application file for complete search history.

(56) References Cited

U.S. PATENT DOCUMENTS

| | | | | |
|---|---|---|---|---|
| 1,755,708 A * | 4/1930 | Symons | ......................... | 254/104 |
| 2,311,042 A * | 2/1943 | Ferguson | ........................ | 269/98 |
| 4,809,420 A * | 3/1989 | Landy et al. | .................... | 29/523 |
| 5,033,178 A * | 7/1991 | Woods | .......................... | 29/281.1 |
| 5,123,148 A * | 6/1992 | Ikeda et al. | ....................... | 29/11 |
| 5,449,062 A * | 9/1995 | McTaggart | ................. | 198/774.3 |
| 5,628,119 A * | 5/1997 | Bingham et al. | ................ | 33/613 |
| 6,546,616 B2 * | 4/2003 | Radowick | ....................... | 29/720 |
| 6,855,060 B2 * | 2/2005 | Breese et al. | ................. | 464/130 |
| 7,320,450 B2 * | 1/2008 | Carnevali | ...................... | 248/160 |
| 7,377,489 B1 * | 5/2008 | Houseman | ...................... | 256/22 |
| 7,421,768 B2 * | 9/2008 | Chiang | ........................... | 29/237 |
| 7,765,662 B2 * | 8/2010 | McKown et al. | ............. | 29/27 C |
| 8,083,182 B2 * | 12/2011 | Cacciaguerra | ............. | 244/129.4 |
| 8,251,356 B2 * | 8/2012 | Eschenburg | .................... | 269/10 |
| 2003/0196314 A1 * | 10/2003 | Appleby et al. | ................ | 29/559 |
| 2006/0273540 A1 * | 12/2006 | Heron et al. | ........... | 280/124.116 |
| 2007/0284479 A1 * | 12/2007 | Pein et al. | .................. | 244/118.2 |
| 2008/0067729 A1 * | 3/2008 | McKown et al. | ............. | 269/313 |

* cited by examiner

*Primary Examiner* — Joshua J Michener
*Assistant Examiner* — Elizabeth A Plummer
(74) *Attorney, Agent, or Firm* — Barnes & Thornburg LLP (57) ABSTRACT

A holder for fastening an interior component, intended for mounting in an aircraft, to a transporting apparatus, includes an interface element configured to be connected to the transporting apparatus for the purpose of fastening the holder to the transporting apparatus. A bearing element is connected to the interface element and has a fixed bearing for bearing a first interior component holder connected to the interior component and a movable bearing for bearing a second interior component holder connected to the interior component.

10 Claims, 6 Drawing Sheets

HOLDER FOR FASTENING AN INTERIOR COMPONENT, INTENDED FOR MOUNTING IN AN AIRCRAFT, TO A TRANSPORTING APPARATUS

CROSS-REFERENCE TO RELATED APPLICATION

This application claims priority to U.S. Provisional Patent Application No. 61/182,310 filed May 29, 2009 and German Patent Application No. 10 2009 023 401.2, filed May 29, 2009, the disclosures of which are incorporated herein by reference.

FIELD OF THE INVENTION

The invention relates to a holder for fastening an interior component, provided for mounting in an aircraft, to a transporting apparatus. Furthermore, the invention relates to a transporting apparatus equipped with such a holder for use on the mounting of an interior component in an aircraft.

SUMMARY

On the mounting of interior components in an aircraft, it is customary at present to connect components, such as, for example, dado panels, side coverings, ceiling coverings, light strips, luggage compartments and the like, individually to the aircraft structure. Since each component has to be separately positioned and fastened to the aircraft structure, the mounting of these components is very time-consuming. Similarly, for example, pipelines serving as air-conducting lines of an aircraft air-conditioning system or for water supply in an aircraft cabin, and also electric lines, are at present also fastened individually to the aircraft structure in a time-consuming manner. After mounting, the proper functioning of all the lines must be checked in a final inspection. In particular, all the pipelines have to undergo a tightness check, while in the case of the electric lines it is necessary to check all the interfaces. These tests are likewise relatively onerous, since the lines and interfaces to be checked are often accessible only with difficulty in the mounted state.

For this reason, efforts are being made to preassemble and test interior components intended for mounting in an aircraft, for example in an aircraft cabin, as extensively as possible outside the aircraft. In particular, large modules which may comprise a plurality of overhead luggage compartments, a plurality of side covering panels and other interior components, such as, for example, electric lines, air-conducting lines of an aircraft air-conditioning system or pipelines serving for water supply in the aircraft cabin, personal service units and personal service channels, are to be preassembled and tested outside the aircraft, optionally with the aid of a suitable mounting apparatus configured for example in the form of a mounting frame. Subsequently, the large modules are to be transported by means of a transporting apparatus into a final mounting position in an aircraft fuselage element.

The invention is directed to the object of providing a holder which ensures simple and secure fastening of an interior component, intended for mounting in an aircraft, to a transporting apparatus and on the final mounting of the interior component in an aircraft fuselage element enables simple uncoupling of the interior component from the transporting apparatus. Furthermore, the invention is directed to the object of providing a transporting apparatus equipped with such a holder for use on the mounting of an interior component in an aircraft.

To achieve these objects, a holder according to the invention for fastening an interior component, intended for mounting in an aircraft, to a transporting apparatus, comprises an interface element which is configured to be connected to the transporting apparatus for the purpose of fastening the holder to the transporting apparatus. The interior component to be fastened to the mounting device may be an individual interior component, preferably however an interior component large module. The large module may, for example, comprise a plurality of overhead luggage compartments, a plurality of side covering panels and other interior components, such as, for example, electric lines, air-conducting lines of an aircraft air-conditioning system or pipelines serving for water supply in the aircraft cabin, personal service units and personal service channels. The interior component can be transported into a final mounting position in an aircraft fuselage element with the aid of the transporting apparatus. The aircraft fuselage element may be a fuselage shell open at least one end side. Alternatively to this, however, the interior component may also be introduced into a virtually completely or completely constructed aircraft fuselage. All that is essential is for the aircraft fuselage element to have an access which enables the interior component to be brought into its final mounting position in the aircraft fuselage element.

The transporting apparatus may be of mobile design, that is to say comprise an undercarriage and an interior component carrier unit. The interface element of the holder according to the invention may be provided for mounting on the interior component carrier unit of the transporting apparatus. For example, the interface element may be configured to be attached to a strut of the interior component carrier unit of the transporting apparatus which extends substantially parallel to a longitudinal axis of the transporting apparatus. The interior component intended for mounting in the aircraft can then be fastened to the interior component carrier unit of the transporting apparatus with the aid of the holder according to the invention.

The holder according to the invention for fastening an interior component intended for mounting in an aircraft further comprises a bearing element which is connected to the interface element. The bearing element has a fixed bearing for bearing a first interior component holder connected to the interior component and a movable bearing for bearing a second interior component holder connected to the interior component. The design of the fixed bearing and/or the movable bearing is adapted to the design of the first and/or the second interior component holder in such a manner that the bearing element of the holder according to the invention enables secure bearing of the first and/or the second interior component holder and thus the interior component on the holder and consequently the transporting apparatus.

The first and/or the second interior component holder may, for example, be a holder which is attached to an interior component configured in the form of an overhead luggage compartment. For example, the first and/or the second interior component holder may be provided to extend from a surface of the interior component, to be connected to the holder according to the invention during the transporting of the interior component on the transporting apparatus, and finally to be fastened to the structure of the aircraft fuselage element when the interior component has reached its final mounting position in the aircraft fuselage element. If the interior component is an interior component module which comprises a plurality of interior components, such as, for example, a plurality of overhead luggage compartments, a plurality of side covering panels and/or other interior components, the entire interior component module can be securely fastened to the transporting apparatus via the connection of the first and/or the second interior component holder to the bearing element of the holder according to the invention.

When an interior component is borne via a first interior component holder in the fixed bearing formed on the bearing element of the holder according to the invention, a movement of the interior component relative to the transporting apparatus during the transporting of the interior component on the transporting apparatus is reliably prevented. Since a movable bearing is additionally formed on the bearing element of the holder according to the invention, two interior component holders of the interior component to be transported on the transporting apparatus can be connected to the holder according to the invention with the aid of a single holder. For example, the holder may receive two interior component holders which are attached to mutually adjacent overhead luggage compartments of an interior component module. Alternatively to this, however, the holder according to the invention may also be used to receive two interior component holders which are fastened to a single interior component. Finally, it is conceivable to use only the fixed bearing or only the movable bearing of the holder according to the invention to attach an interior component to the holder according to the invention.

In particular by the configuration of the bearing element with a fixed bearing, the holder according to the invention enables the fastening of an interior component in an unambiguous position relative to a transporting apparatus. By designing the second bearing provided on the bearing element as a movable bearing, it is possible, moreover, in a simple and convenient manner to compensate for tolerances in the position of the interior component holder on the interior component intended for transporting on the transporting apparatus. An interior component intended for transporting on a transporting apparatus can therefore be quickly and securely fastened to the transporting apparatus with the aid of the holder according to the invention, be held on the transporting apparatus during the transporting on the transporting apparatus and finally, again in a simple manner, be uncoupled from the transporting apparatus and mounted, for example, on the structure of an aircraft fuselage element. The holder according to the invention thus enables simple and secure transporting of interior components preassembled outside an aircraft into a final mounting position in an aircraft fuselage element. By using the holder according to the invention, the process for mounting interior components in an aircraft can thus be made more efficient overall.

Since the holder according to the invention is provided for cooperating only with interior component holders which are attached to an interior component to be transported on a transporting apparatus, the holder according to the invention enables the transporting of interior components on the transporting apparatus without supporting or touching the interior components in regions which constitute regions of the interior components which are visible in the finally mounted state of the interior components. As a result, an optimal visual appearance of the interior components in the state finally mounted in an aircraft is ensured.

The interface element of the holder according to the invention may comprise a base plate. Furthermore, the interface element or the base plate of the interface element may be provided with a plurality of bores for receiving suitable fastening devices for fastening the interface element and thus the holder to the transporting apparatus. For example, the bores may be configured to receive screws which can be connected to sliding blocks. The sliding blocks may, for example, be received in a frictionally engaged manner in a rail which is formed on the transporting apparatus or a strut of the interior component carrier unit of the transporting apparatus. As a result, the interface element and thus the holder can be fastened to the transporting apparatus in a simple and convenient manner in a plurality of positions. The transporting apparatus can then, if required, be flexibly adapted to the geometry of the interior component to be transported on the transporting apparatus. The bearing element of the holder according to the invention may extend from the base plate of the interface element. For example, the bearing element may comprise a base body which extends substantially perpendicularly to the base plate of the interface element.

When the holder according to the invention is rigidly connected to the transporting apparatus via the interface element, the holder follows the movements of the transporting apparatus. For example, a holder mounted on an interior component carrier unit of the transporting apparatus follows the movements of the interior component carrier unit on the mounting of the interior component on the transporting apparatus and on the uncoupling of the interior component from the transporting apparatus. As a result, in principle, an independent kinematic function of the holder may be dispensed with. If desired or required, however, the holder may also be provided with a kinematic function. For example, the bearing element may be movably connected to the interface element, so that the bearing element is able, if necessary, to perform a relative movement to the interface element. If desired, there may also be provided a, for example hydraulic or pneumatic, drive unit which displaces the bearing element, if necessary, in one, two or three spatial direction(s) relative to the interface element.

The fixed bearing and/or the movable bearing which is/are formed on the bearing element of the holder according to the invention may comprise a receiving device which is configured to receive a fastening device fixed to the first interior component holder and/or the second interior component holder. For example, the receiving device may be provided to receive a bolt fixed to the first and/or the second interior component holder. The receiving devices of the fixed bearing and the movable bearing may be formed mutually adjacently on the bearing element of the holder according to the invention. For example, the receiving devices may be formed in the region of two lateral faces of the bearing element directed away from one another. The first and the second interior component holder may then be received in a simple and convenient manner at the same time in the fixed bearing and the movable bearing of the holder according to the invention.

The receiving device of the fixed bearing and/or the movable bearing may comprise a supporting face which is provided to receive the fastening device fixed to the first and/or the second interior component holder. In the state of the holder according to the invention fastened to the transporting apparatus, the supporting face is preferably horizontally oriented in order to ensure secure reception of the fastening device fixed to the first and/or the second interior component holder. For example, the supporting face may extend substantially perpendicularly to the base plate of the interface element, so that the supporting face is horizontally oriented when the holder is fastened via the interface element to a substantially vertically oriented face of the interior component carrier unit of the transporting apparatus.

The supporting face(s) formed on the receiving device of the fixed bearing and/or the movable bearing are preferably bounded at an end directed towards the interface element by a first stop face. The first stop face enables a defined reception of the fastening device, fixed to the first and/or the second interior component holder, in the receiving device of the fixed bearing and/or the movable bearing. In particular, this enables an unambiguous positioning of an interior component relative to the transporting apparatus on the reception of the interior component on the transporting apparatus, but also on the uncoupling of the interior component on the final mounting of the interior component in the aircraft. The first stop face may be configured as a plane surface, but also as a curved surface. For example, the shape of the first stop face may be adapted to the shape of the fastening device fixed to the first and/or the second interior component holder. A first stop face of curved shape is thus particularly suitable when the fastening device fixed to the first and/or the second interior component holder is designed in the form of a bolt which itself has a circular cross-section or bears a head having a circular cross-section for reception in the receiving device of the fixed bearing and/or the movable bearing.

The supporting face of the receiving device of the fixed bearing and/or the movable bearing may be bounded at an end directed away from the interface element by a second stop face. The second stop face may extend, for example, like the first stop face, substantially perpendicularly to the supporting face. The second stop face serves for holding a fastening device, fixed to the first and/or the second interior component holder, in its position on the supporting face. In other words, the second stop face performs a securing function, but it may however impede the uncoupling of an interior component, fastened to a transporting apparatus by means of the holder according to the invention, from the transporting apparatus. The use of a holder having a second stop face is thus particularly suitable when particularly secure fastening of the interior component to the transporting apparatus is required. This may be the case, for example, when the interior component is relatively heavy and/or has to be transported over uneven ground by means of the transporting apparatus.

The holder according to the invention preferably comprises a securing device which is configured to secure a fastening device, fixed to the first interior component holder and/or the second interior component holder, in its position in the receiving device of the fixed bearing and/or the movable bearing. With the aid of the securing device, an interior component fastened to a transporting apparatus by means of the holder according to the invention is prevented from falling off the transporting apparatus during the transporting on the transporting apparatus. In principle, it is conceivable to provide separate securing devices for the fixed bearing and the movable bearing or a fastening device received in the receiving device of the fixed bearing and a fastening device received in the receiving device of the movable bearing. Alternatively to this, however, it is also conceivable to provide a common securing device for the fixed bearing and the movable bearing. As a result, the construction of the securing device and thus of the holder according to the invention is simplified.

The securing device may comprise a securing face disposed opposite the supporting face of the receiving device of the fixed bearing and/or the movable bearing. The securing face secures a fastening device, received in the receiving device of the fixed bearing and/or the movable bearing and fixed to the first and/or the second interior component holder, against a movement perpendicular to the supporting face. When the supporting face and the securing face opposite it are substantially horizontally oriented in the state of the holder according to the invention mounted on a transporting apparatus, the securing face secures a fastening device, received in the receiving device of the fixed bearing and/or the movable bearing and fixed to the first and/or the second interior component holder, against a vertical movement relative to the transporting apparatus.

The securing face may be formed on the bearing element of the holder itself. For example, the receiving device may be formed, with the supporting face and the securing face of the securing device being disposed opposite the supporting face, by a substantially U-shaped recess which is formed in a substantially cuboid-shaped base body of the bearing element. The supporting face and the securing face are then fixed relative to one another. Alternatively to this, however, it is also conceivable to form the securing face on a securing element which is movable relative to the receiving device, bearing the supporting face, of the fixed bearing and/or the movable bearing. For example, the securing element may be displaceable relative to the receiving device, for example perpendicularly to the supporting face. Furthermore, a securing element which is pivotable relative to the receiving device about a pivot may be envisaged. The pivot may be arranged in a region of the receiving device or the securing element directed towards the interface element.

A securing element movable relative to the receiving device of the fixed bearing and/or the movable bearing may comprise a self-closing closing mechanism which brings about an automatic movement of the securing element into a closed position when a fastening device fixed to the first and/or the second interior component holder has reached the desired position in the receiving device of the fixed bearing and/or the movable bearing. The closing mechanism may, for example, be designed as a catch mechanism or comprise a spring which urges the securing element into a closed position relative to the receiving device of the fixed bearing and/or the movable bearing.

Particularly when the securing device is not provided with a securing element movable relative to the receiving device of the fixed bearing and/or the movable bearing, the securing device preferably comprises a securing bolt. The securing bolt may, for example, be insertable into bores formed in the bearing element of the holder according to the invention, so that, in its state mounted on the holder, it bounds the supporting face of the receiving device of the fixed bearing and/or the movable bearing at an end directed away from the interface element. The securing bolt thus prevents a fastening device, received in the receiving device of the fixed bearing and/or the movable bearing and fixed to the first and/or the second interior component holder, from moving in an undesirable manner from its position in the receiving device of the fixed bearing and/or the movable bearing.

The securing bolt may, for example, be of U-shaped configuration and may comprise two legs which, in the state of the securing bolt mounted on the holder, bound the supporting face of the receiving device of the fixed bearing and/or the movable bearing at an end directed away from the interface element. As a result, only one bolt is required to secure the fixed bearing and the movable bearing.

Preferably, the receiving device of the fixed bearing and/or the movable bearing and/or the securing device comprises/comprise, in a region directed away from the interface element, a guiding face inclined relative to the supporting face of the receiving device of the fixed bearing and/or the movable bearing. The guiding face serves for guiding a fastening device, fixed to the first interior component holder and/or the second interior component holder, upon reception in the receiving device of the fixed bearing and/or the movable bearing. A guiding face formed on the receiving device of the fixed bearing and/or the movable bearing may directly adjoin the supporting face of the receiving device. Alternatively to this, the guiding face may be separated from the supporting face of the receiving device by a projection bearing the second stop face. Similarly, a guiding face of the securing device may adjoin the securing face of the securing device or be arranged at a distance from the securing face of the securing device.

Preferably, a guiding face formed on the receiving device of the fixed bearing and/or the movable bearing is inclined relative to the supporting face of the receiving device in such a manner that the guiding face facilitates the reception of the fastening device, fixed to the first and/or the second interior component holder, in the receiving device. For example, a guiding face formed on the receiving device may be inclined downwards relative to a horizontally oriented supporting face. A fastening device which is to be received in the receiving device of the fixed bearing and/or the movable bearing by a substantially horizontal mounting movement either of the interior component, but preferably of the transporting apparatus and thus of the holder according to the invention fastened to the transporting apparatus, is thus guided by the guiding face conveniently into its position in the receiving device.

A guiding face formed on the receiving device of the fixed bearing and/or the movable bearing is preferably disposed opposite a guiding face formed on the securing device, the guiding face formed on the receiving device of the fixed bearing and/or the movable bearing and the guiding face formed on the securing device being inclined in opposite directions relative to the supporting face of the receiving device of the fixed bearing in such a manner that the two guiding faces are at a greater distance from one another in a region directed away from the interface element than in a region directed towards the interface element. Such a configuration of the guiding faces enables particularly simple reception of a fastening device, fixed to the first and/or the second interior component holder, in the receiving device of the fixed bearing and/or the movable bearing.

The fixed bearing of the holder according to the invention preferably comprises a fixing device which is connected to the interface element at a distance from the bearing element adapted to the geometry of the first interior component holder. The fixing device is preferably configured to fix the first interior component holder in its position relative to the bearing element. In particular, the fixing device secures the first interior component holder, and thus the interior component fastened to a transporting apparatus by means of the holder according to the invention, against a movement relative to the bearing element in a direction parallel to the supporting surface of the receiving device of the fixed bearing.

For example, the fixing device may comprise at least one strut which extends from the interface element. For example, a strut of the fixing device may extend substantially perpendicularly to the interface element, or the base plate of the interface element, opposite the bearing element and at a distance from the bearing element of the interface element adapted to the geometry of the first interior component holder. If desired or required, however, the fixing device may also comprise a plurality of, for example two, struts which are arranged substantially parallel to one another. A fixing device which comprises one or more strut(s) can be designed to be particularly lightweight. If desired, however, the fixing device may also be configured in the shape of a plate which extends at a distance from the bearing element of the interface element adapted to the geometry of the first interior component holder.

The fixing device may bear, at an end directed away from the interface element, a guiding face which is inclined relative to a fixing face disposed opposite the bearing element in such a manner that the guiding face is at a greater distance from the bearing element in a region directed away from the interface element than in a region directed towards the interface element. When the first interior component holder is connected to the holder according to the invention via the fixed bearing, for example a plate-shaped fastening element of the interior component holder may bear against the fixing face formed on the bearing element. In other words, the plate-shaped fastening element of the first interior component holder may be received between the fixing device and the fixing face formed on the bearing element. The guiding face formed on the fixing device facilitates the insertion of the first interior component holder, in particular of a plate-shaped fastening element of the first interior component holder, in its position between the fixing device and the bearing element.

A transporting apparatus according to the invention for use on the mounting of an interior component in an aircraft comprises an undercarriage and an interior component carrier unit which is supported on the undercarriage. At least one above-described holder for fastening an interior component to the transporting apparatus is fastened to the interior component carrier unit of the transporting apparatus. For example, the holder may be fastened to an element, configured for example in the form of strut, of the interior component carrier unit, which element extends substantially parallel to a longitudinal axis of the transporting apparatus. Preferably, the holder is fastened to a substantially vertically oriented surface of the interior component carrier unit.

If desired, a plurality of above-described holders may be attached to the transporting apparatus according to the invention. The holders may then be positioned in a manner distributed along the longitudinal axis of the transporting apparatus. Preferably, the holders are fastened releasably, or at least displaceably in their position, to the interior component carrier unit of the transporting apparatus, so that the holders may be adapted, as required, to the positions of interior component holders which are attached to an interior component intended for transporting on the transporting apparatus according to the invention. If desired, the holder(s) may be provided with adjusting elements which enable an adjustment of the holder (s) on the interior component carrier unit in one, two or three spatial direction(s).

Preferred embodiments of a holder according to the invention for fastening an interior component, intended for mounting in an aircraft, to a transporting apparatus will now be explained in more detail with reference to the appended schematic figures, of which

BRIEF DESCRIPTION OF THE DRAWINGS

DETAILED DESCRIPTION OF THE DRAWINGS

FIGS. 1-5 illustrate a first embodiment of a holder 10 for fastening an interior component 12, intended for mounting in an aircraft, to a transporting apparatus 14. As can be seen in particular from FIG. 5a, the interior component 12 is configured in the form of an interior component large module which comprises three overhead luggage compartments 16 and three side covering panels 18 connected to the overhead luggage compartments 16. Furthermore, other interior components, such as, for example, electric lines, air- or water-conducting lines, personal service units and personal service channels, can be connected to the overhead luggage compartments 16 and the side covering panels 18.

Figure 5A:
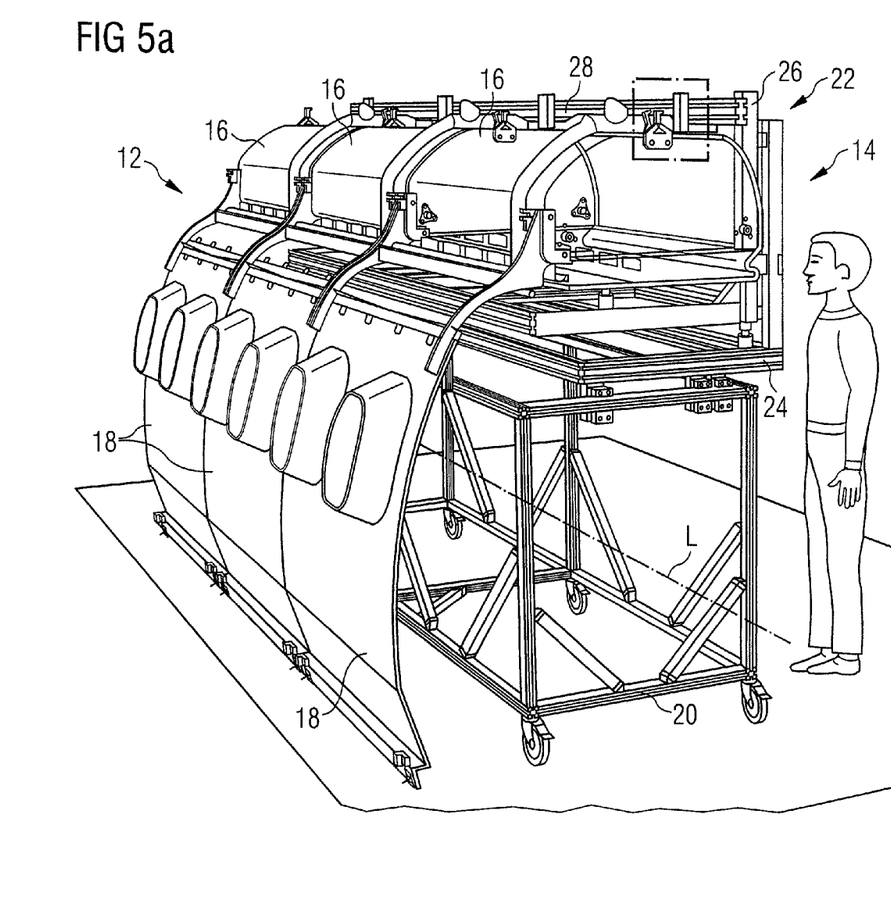
FIG. 5a shows a three-dimensional illustration of a transporting apparatus provided with a plurality of holders illustrated in FIGS. 1-4.
Figure 5B:
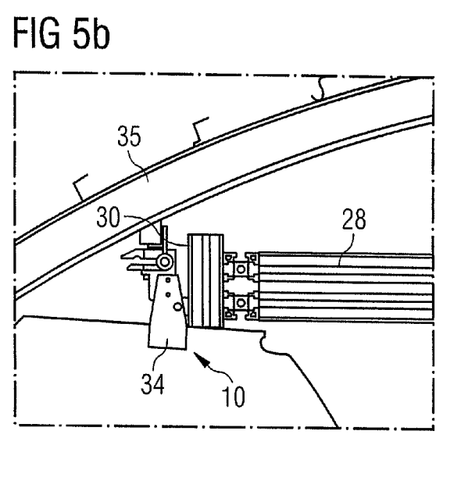
FIG. 5b shows a detail illustration of the transporting apparatus according to FIG. 5a, in which the holder shown in FIGS. 1-4 is illustrated in cooperation with an interior component holder on the final mounting of an interior component on an aircraft structure.

The transporting apparatus 14 comprises an undercarriage 20 and an interior component carrier unit 22 which is supported on the undercarriage 20. The interior component carrier unit 22 is configured in two parts and comprises an L-carrier unit 24 connected directly to the undercarriage 20 and a C-carrier unit 26 connected to the L-carrier unit 24. The undercarriage 20 and the carrier units 24, 26 of the interior component carrier unit 22 are constructed from a plurality of struts.

The L-carrier unit 24 of the interior component carrier unit 22 is movable horizontally relative to the undercarriage 20 via a sliding unit, it being possible for the L-carrier unit 24 to be movable horizontally relative to the undercarriage 20 in only one direction, that is to say, for example, perpendicularly to a longitudinal axis L of the transporting apparatus 14, or in two directions, that is to say, for example, both perpendicularly and parallel to the longitudinal axis L of the transporting apparatus 14, as required. Furthermore, the C-carrier unit 26 of the interior component carrier unit 22 is movable vertically relative to the L-carrier unit 24.

A plurality of holders 10 are attached to a strut 28 of the C-carrier unit 26, which extends substantially parallel to the longitudinal axis L of the transporting apparatus 14. As can best be seen in FIG. 5b, the holders 10 extend from a substantially vertically oriented surface 30 of the strut 28. The arrangement of the holders 10 on the strut 28 is adapted to the arrangement of first and second interior component holders 32, 34 which are connected to the overhead luggage compartments 16 and extend upwards from a top panel of the overhead luggage compartments 16. By means of the interior component holders 32, 34, the overhead luggage compartments 16 and thus the entire interior component 12 configured in the form of a large module can be fastened in a suspended manner to the structure 35 of an aircraft fuselage element, see FIG. 5b. During the transporting of the interior component 12 on the transporting apparatus 14, in contrast, the interior component holders 32, 34 serve for the suspended fastening of the interior component 12 to the transporting apparatus 14.

As can best be seen in FIGS. 1-4, each holder 10 comprises an interface element 36 having a substantially rectangular base plate 38. In the base plate 38 of the interface element 36 there are provided bores 40 which serve for receiving screws for fastening the interface element 36 and thus the holder 10 to the strut 28 of the transporting apparatus 14. In particular, the bores 40 are provided to have screws passing through them which cooperate with sliding blocks fastened to the strut 28, in order to fix the interface element 36 and thus the holder 10 in a frictionally engaged manner to the strut 28 of the transporting apparatus 14.

In the state mounted on the strut 28 of the transporting apparatus 14, the base plate 38 is oriented substantially in the vertical direction. A bearing element 42 connected to the interface element 36 comprises a substantially cuboid-shaped base body 44 which extends substantially perpendicularly to the base plate 38 of the interface element 36. In the state of the holder 10 mounted on the strut 28 of the transporting apparatus 14, the bearing element 42 thus extends in the substantially horizontal direction perpendicularly to the surface 30 of the strut 28.

The bearing element 42 has a fixed bearing 46 and a movable bearing 48. As can best be seen in FIG. 4, the fixed bearing 46 serves for bearing a first interior component holder 32 connected to the interior component 12. The movable bearing 48, in contrast, serves for bearing a second interior component holder 34 connected to the interior component 12.

The fixed bearing 46 and the movable bearing 48 each comprise a receiving device 50 which is formed by a lower part of a substantially U-shaped indentation in the base body 44 of the bearing element 42. The receiving device 50 is configured to receive a fastening device 52 which is fixed to the first and the second interior component holder 32, 34. In the example shown in FIG. 4, the fastening device 52 comprises a bolt 54 having a head 56 provided for reception in the receiving device 50. The bolt is fastened to the interior component holder 32, 34 by means of a nut 58.

The receiving device 50 of the fixed bearing 46 and of the movable bearing 48 comprises a supporting face 60 which serves for receiving the head 56 of the bolt 54. In the state of the holder 10 mounted on the strut 28 of the transporting apparatus 14, the supporting face 60 is oriented substantially horizontally. At an end directed towards the interface element 36, the supporting face 60 is bounded by a first stop face 62. In the case of the holder 10 illustrated in FIGS. 1-4, the first stop face 62 is of curved shape and thus adapted to the shape of the head 56 of the bolt 54.

In order to hold the fastening device 52 securely in its position in the receiving device 50 of the fixed bearing 46 and the movable bearing 48, the holder 10 further comprises a securing device 64 which comprises a securing face 66 disposed opposite the supporting face 60 of the receiving device 50. The securing face 66 secures the fastening device 52 against a movement perpendicularly to the supporting face 60. As a result, a vertical movement of the interior component 12, fastened to the transporting apparatus 14 by means of the holder 10, relative to the transporting apparatus 14 is prevented.

Figure 1:
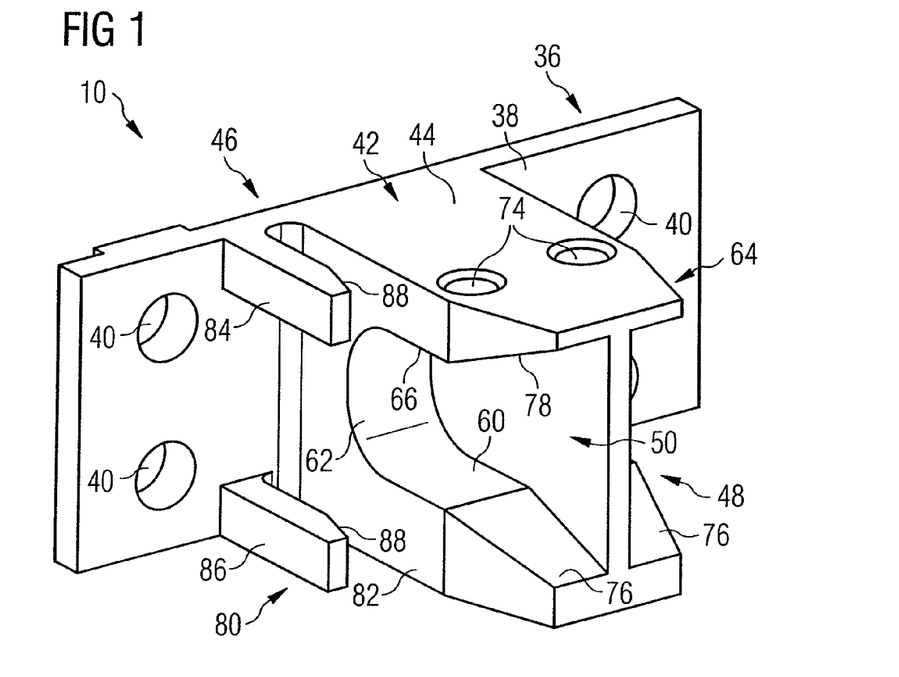
FIG. 1 shows a three-dimensional illustration of a first embodiment of a holder for fastening an interior component, intended for mounting in an aircraft, to a transporting apparatus.
Figure 2:
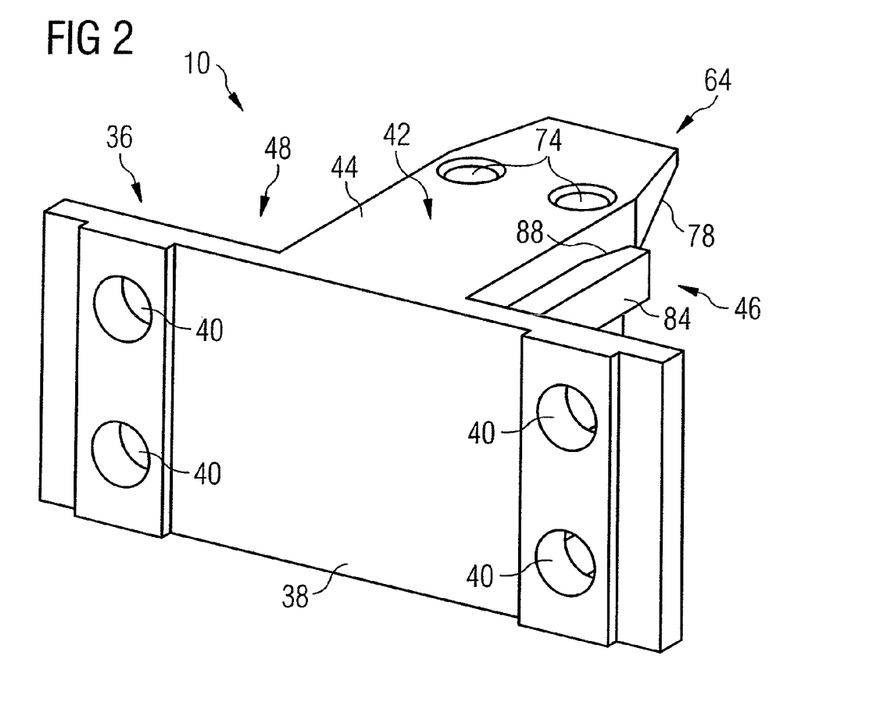
FIG. 2 shows a three-dimensional rear view of the holder according to FIG. 1.
Figure 3:
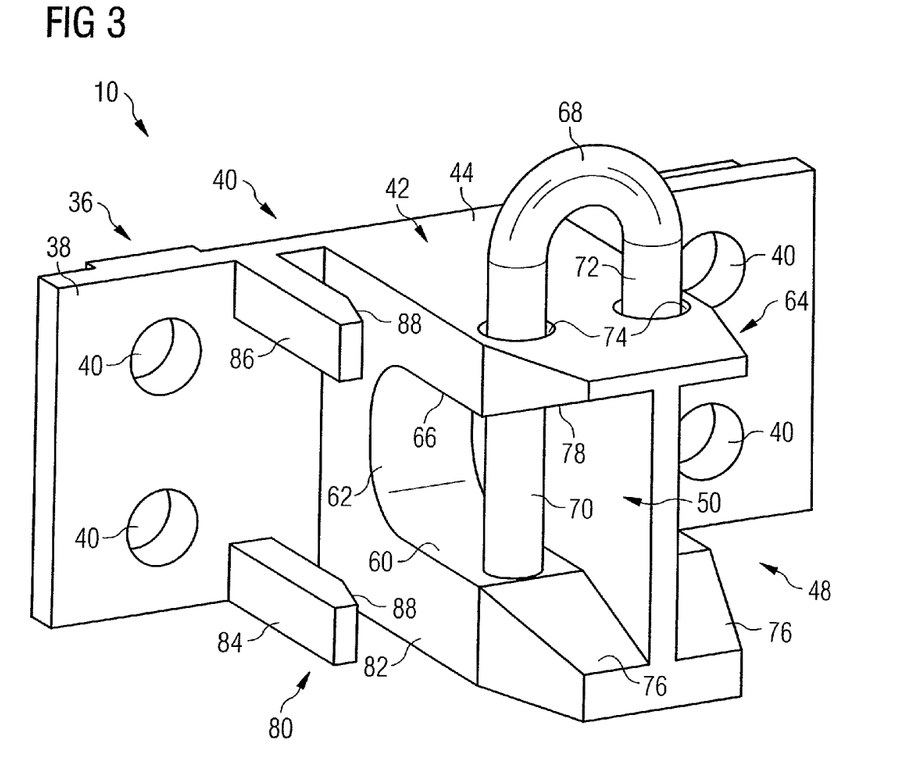
FIG. 3 shows the holder according to FIG. 1 in the state provided with a securing bolt.
Figure 4:
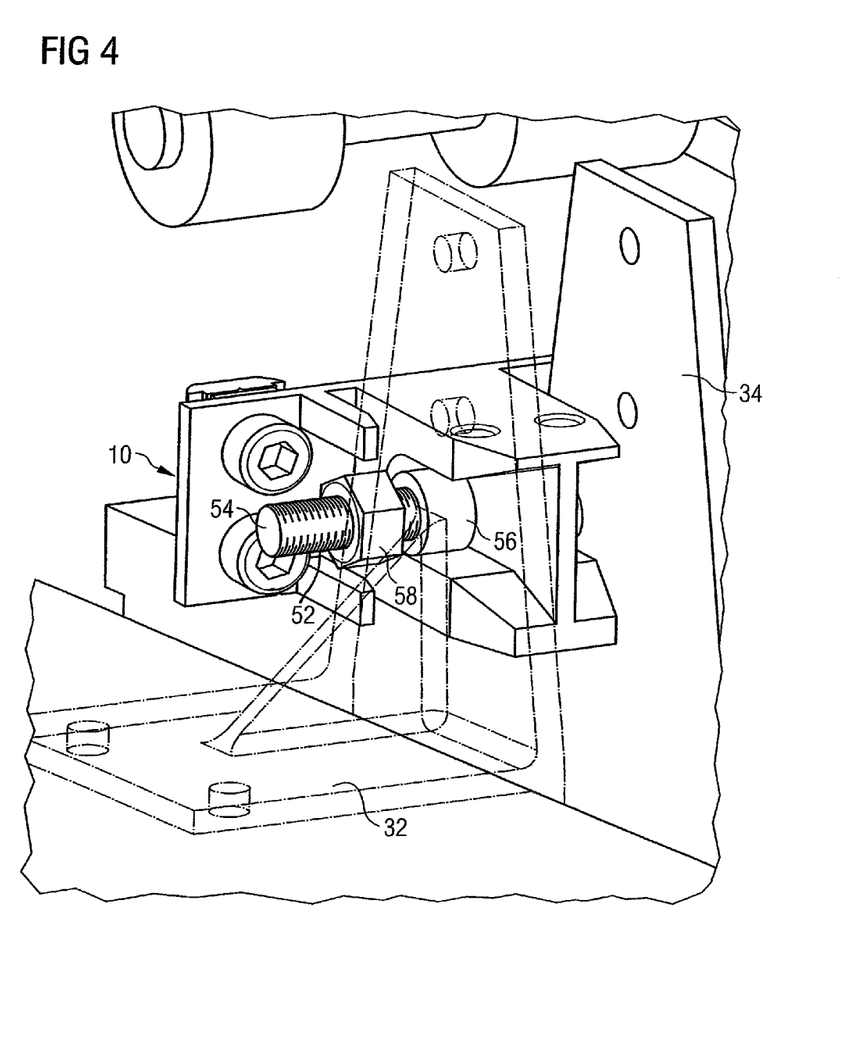
FIG. 4 shows the holder according to FIG. 1 in a state connected to a first and a second interior component holder.

The securing device 64 further comprises a U-shaped securing bolt 68 (see FIG. 3). The securing bolt 68 comprises two legs 70, 72 which pass through bores 74 formed in the bearing element 42 and in the mounted state of the securing bolt 68 bound the supporting face 60 of the receiving device 50 of the fixed bearing 46 and the movable bearing 48 at an end directed away from the interface element 36. A fastening device 52 received in the receiving device 50 of the fixed bearing 46 and of the movable bearing 48 is thus prevented by the securing bolt 58 from slipping out of the receiving device 50.

The receiving device 50 of the fixed bearing 46 and the movable bearing 48 further comprises, in a region directed away from the interface element 36, a guiding face 76 inclined relative to the supporting face 60. In addition to this, the securing device 64 also comprises, in a region directed away from the interface element 36, a guiding face 78 which is arranged opposite the guiding face 76 formed on the receiving device 50 and is likewise inclined relative to the supporting face of the receiving device 50. In particular, the guiding faces 76, 78 are inclined in opposite directions in such a manner that the guiding faces 76, 78 are at a greater distance from one another in a region directed away from the interface element 36 than in a region directed towards the interface element 36. The guiding faces 76, 78 facilitate the insertion of the fastening device 52 into the receiving device 50 of the fixed bearing 46 and the movable bearing 48.

The fixed bearing 46 comprises, beside the receiving device 50, a fixing device 80 which is connected to the interface element 36 at a distance from the bearing element 42 adapted to the geometry of the first interior component holder 32. The fixing device 80 serves for fixing a plate-shaped fastening element of the first interior component holder 32 in its position relative to the bearing element 42. In particular, the fixing device 80 prevents a displacement of the first interior component holder 32 in a direction perpendicular to a fixing surface 82 of the bearing element 42.

The fixing device 80 comprises two struts 84, 86 which are arranged parallel to one another and extend substantially perpendicularly from the base plate 38 of the interface element 36. The struts 84, 86 each bear, at an end directed away from the interface element 36, a guiding face 88 which is inclined relative to the opposite fixing face 82 of the bearing element 42 in such a manner that the guiding face 88 is at a greater distance from the bearing element 42 in a region directed away from the interface element 36 than in a region directed towards the interface element 36. The fastening of the first interior component holder 32 in the fixed bearing 46 is further facilitated by the guiding face 88 formed on the struts 84, 86.

As already mentioned, it is possible to fasten the holders 10 to the interior component carrier unit 22 of the transporting apparatus 14 at different positions. Once the holders 10 are attached to the interior component carrier unit 22 in a desired position, however, the holders 10 are rigidly fixed to the interior component carrier unit 22. The holders 10 are thus carried along with the interior component carrier unit 22 when the interior component carrier unit 22 is moved. Consequently, the holders 10 also perform a mounting movement performed by the interior component carrier unit 22. It is therefore possible to receive the interior component 12 on the transporting apparatus 14 by moving the interior component carrier unit 22 horizontally in a direction perpendicular to the longitudinal axis L of the transporting apparatus 14 until the fastening devices 52 fastened to the interior component holders 32, 34 are received in the fixed bearings 46 and the movable bearings 48 of the holders 10.

Since each holder 10 comprises a fixed bearing 46 and a movable bearing 48, tolerances in the positioning of the interior component holders 32, 34 can be compensated for in a convenient manner. When the fastening devices 52 of the interior component holders 32, 34 have reached the desired position in the receiving devices 50 of the holders 10, they can be secured in their position with the aid of the securing bolt 68. As a result, it is possible to hold the interior component 12 securely on the transporting apparatus 14.

As can be seen in particular from FIG. 5a, the interior component 12 is borne in a suspended manner on the transporting apparatus 14 by means of the holders 10. Consequently, it is not necessary to support the interior component 12 in regions which are visible in the finally mounted state of the interior component 12. As a result, a visually optimal appearance of the interior component 12 is ensured.

On the mounting of the interior component 12 in an aircraft fuselage element, the interior component 12 is transported into its final mounting position in the aircraft fuselage element by means of the transporting apparatus 14. The interior component 12 can then be fastened by means of the interior component holders 32, 34 to the structure 35 of the aircraft fuselage element. Only when the interior component 12 has been at least provisionally fastened to the structure 35 of the aircraft fuselage element is the interior component 12 released from the transporting apparatus 14. For this purpose, the securing bolt 68 is firstly removed. Then, all that is required is to release the holder 10 from the interior component holders 32, 34 by a movement of the holder 10 in a direction perpendicular to the longitudinal axis L of the transporting apparatus 14. The movement of the holder 10 can be realised by a relative movement of the interior component carrier unit 22 to the undercarriage 20 of the transporting apparatus 14 or by a movement of the complete transporting apparatus 14. By means of the holder 10, the interior component 12 can thus also be uncoupled in a simple manner from the transporting apparatus 14 when the interior component 12 has reached its final mounting position in the aircraft fuselage element.

Both on the mounting of the interior component 12 on the transporting apparatus 14 and on uncoupling of the interior component 12 from the transporting apparatus 14, the interior component holders 32, 34 can each be simultaneously connected to the holder 10 or uncoupled from the holder 10. As a result, the mounting process of an interior component 12, preassembled outside the aircraft fuselage element, in the aircraft fuselage element is further simplified.

Figure 6:
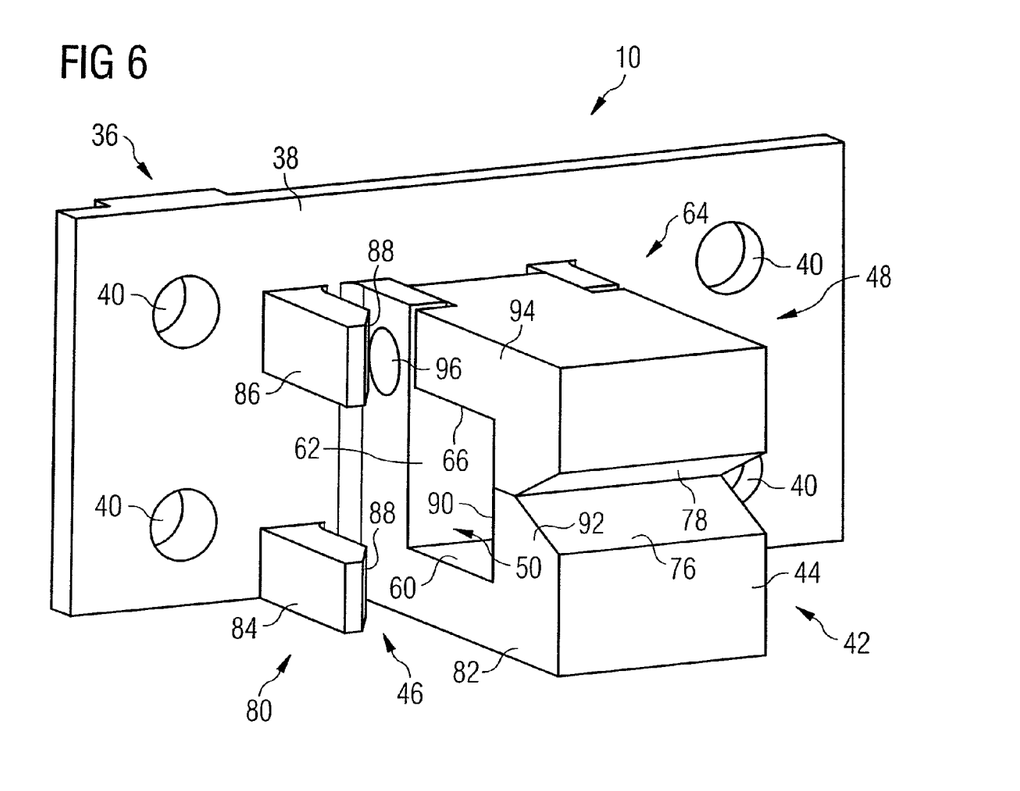
FIG. 6 shows a three-dimensional illustration of a second embodiment of a holder for fastening an interior component, intended for mounting in an aircraft, to a transporting apparatus.
Figure 7:
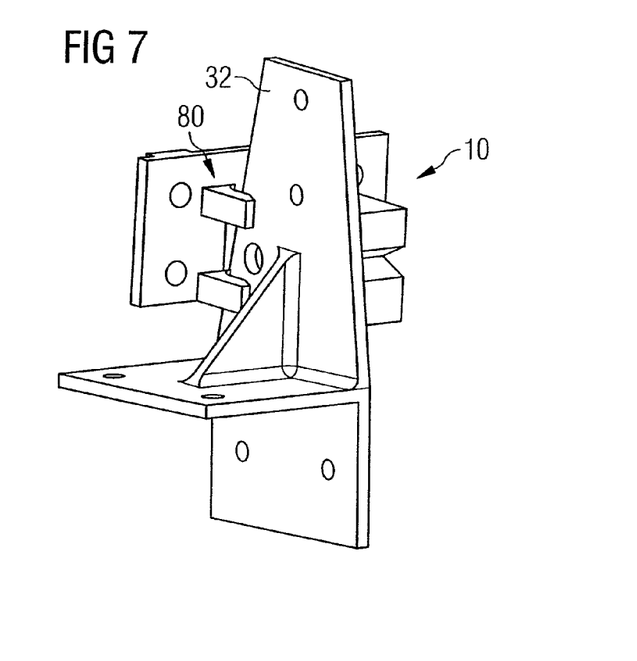
FIG. 7 shows the holder according to FIG. 6 in the state connected to a first interior component holder.

FIGS. 6 and 7 show a second embodiment of a holder 10 for fastening an interior component 12, provided for mounting in an aircraft, to a transporting apparatus 14. The holder illustrated in FIGS. 6 and 7 differs from the holder according to FIGS. 1-4 by the configuration of the bearing element 42 and of the securing device 64. In particular, in the case of the holder 10 illustrated in FIGS. 6 and 7, the first stop face 62 of the receiving device 50 of the fixed bearing 46 and the movable bearing 48 is designed as a plane surface. Moreover, a second stop face 90 is present, which is disposed opposite the first stop face 62 and bounds the supporting face 60 of the receiving device 50 of the fixed bearing 46 and the movable bearing 48 at an end directed away from the interface element 36. The guiding face 76 formed on the receiving device 50 does not directly adjoin the supporting face 60 as in the arrangement according to FIGS. 1-4, but is separated from the supporting face 60 by a projection 92 bearing the second stop face 90.

Furthermore, the securing device 64 comprises a securing element 94 bearing the securing face 66. The securing element 94 is pivotable about a pivot 96 relative to the bearing element 42 and thus relative to the receiving device 50, bearing the supporting face 60, of the fixed bearing 46 and the movable bearing 48. The securing element 94 is prestressed by a suitable prestressing device into its closed position illustrated in FIGS. 6 and 7. For example, a spring or a catch mechanism can be used for this purpose.

On reception of the interior component 12 on the transporting apparatus 14, the interior component holders 32, 34 are connected to the holder 10 by the fastening devices 52, fixed to the interior component holders 32, 34, being received in the fixed bearing 46 and the movable bearing 48 of the holder 10. For this purpose, the securing element 94 can be pivoted about the pivot 96 to facilitate the reception of the fastening devices 52 in the receiving devices 50 of the fixed bearing 46 and the movable bearing 48. Alternatively to this, however, it is also conceivable for the securing element 94 to be pushed into its open position by the contact with the fastening devices 52. When the fastening devices 52 have reached their position in the receiving devices 50, the securing element 94 is automatically moved into its closed position illustrated in FIGS. 6 and 7.

On uncoupling of the interior component 12 from the transporting apparatus 14, the securing element 94 is manually pivoted about the pivot 96. The fastening devices 52 can thus be released from their position in the receiving devices 50 of the fixed bearing 46 and the movable bearing 48. In other respects, the construction and functioning of the holder 10 shown in FIGS. 6 and 7 correspond to the construction and functioning of the holder illustrated in FIGS. 1-4.

Figure 8:
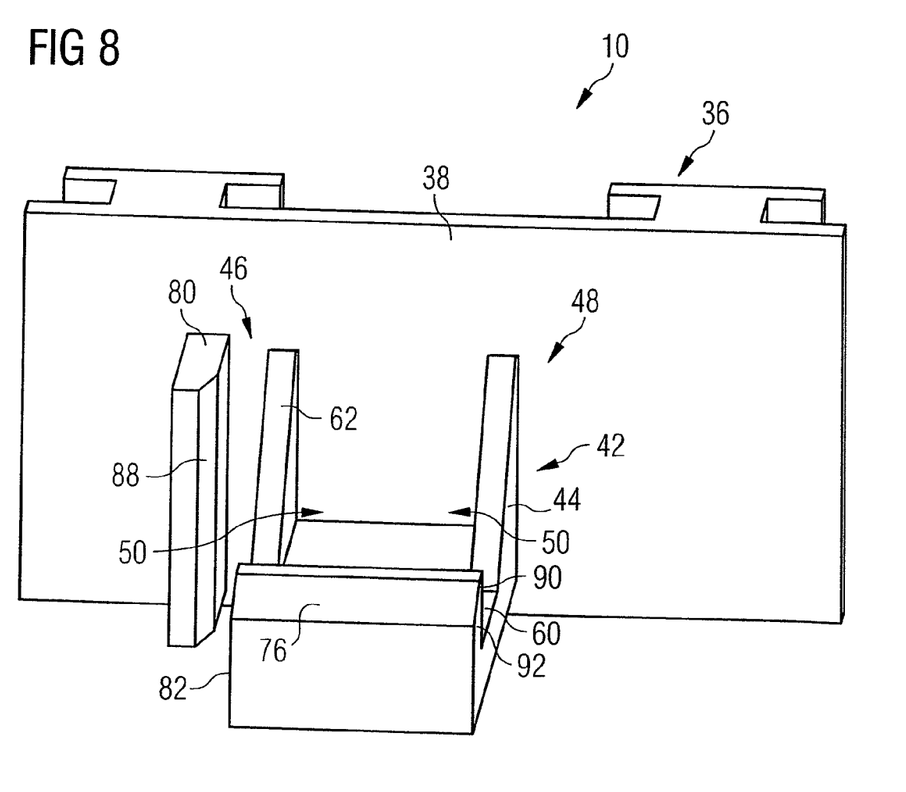
FIG. 8 shows a three-dimensional illustration of a third embodiment of a holder for fastening an interior component, intended for mounting in an aircraft, to a transporting apparatus.

Finally, FIG. 8 shows a third embodiment of a particularly simply designed holder 10 for fastening an interior component 12, intended for mounting in an aircraft, to a transporting apparatus 14. The holder 10 shown in FIG. 8 differs from the arrangement according to FIGS. 6 and 7 in that it does not comprise a securing device for securing a fastening device in the receiving device 50 of the fixed bearing 46 and the movable bearing 48. Furthermore, in the case of the holder 10 according to FIG. 8, the first stop face 62 is inclined relative to the supporting face 60. Finally, the fixing device 80 of the fixed bearing 46 is configured in the shape of a plate which extends substantially perpendicularly to the base plate 38 of the interface element 36 from the base plate 38 of the interface element 36. In other respects, the construction and functioning of the holder 10 shown in FIG. 8 correspond to the construction and functioning of the arrangement illustrated in FIGS. 6 and 7.

What is claimed is:

1. A holder for fastening an interior component, intended for mounting in an aircraft, to a transporting apparatus, the holder comprising:
    an interface element configured to be connected to the transporting apparatus for the purpose of fastening the holder to the transporting apparatus, and
    a bearing element connected to the interface element, the bearing element having a first bearing comprising a first bearing surface and at least one strut extending from the interface element for bearing a first interior component holder connected to the interior component and a second bearing comprising a second bearing surface for bearing a second interior component holder connected to the interior component, and two bores,
    wherein at least one of the first bearing and the second bearing comprises a receiving device configured to receive a fastening device fixed to at least one of the first interior component holder and the second interior component holder,
    and wherein the holder further comprises a securing device configured to secure the fastening device, fixed to the at least one of the first interior component holder and the second interior component holder, in position in the receiving device of the at least one of the first bearing and the second bearing,
    and wherein the securing device is configured to be inserted into the two bores.

2. The holder according to claim 1, wherein the interface element comprises a base plate defining a plurality of bores, separate from the two bores, configured to receive fastening devices for fastening the holder to the transporting apparatus.

3. The holder according to claim 1, wherein the receiving device of the at least one of the first bearing and the second bearing comprises a supporting face bounded at an end directed towards the interface element by a first stop face.

4. The holder according to claim 3, wherein the securing device comprises a securing face disposed opposite the supporting face of the receiving device of the at least one of the first bearing and the second bearing.

5. The holder according to claim 3, wherein the securing device comprises a securing bolt which, when mounted on the holder, bounds the supporting face of the receiving device of the at least one of the first bearing and the second bearing at an end directed away from the interface element.

6. The holder according to claim 5, wherein the securing bolt is of U-shaped configuration and comprises two legs which, when inserted into the two bores, bound the supporting face of the receiving device of the at least one of the first bearing and the second bearing at an end directed away from the interface element.

7. The holder according to claim 3, wherein at least one of the receiving device of the at least one of the first bearing and the second bearing and the securing device comprises, in a region directed away from the interface element, a first guiding face inclined relative to the supporting face of the receiving device of the at least one of the first bearing and the second bearing for guiding the fastening device, fixed to the at least one of the first interior component holder and the second interior component holder, upon reception in the receiving device of the at least one of the first bearing and the second bearing.

8. The holder according to claim 1, wherein the at least one strut extends from the interface element at a distance from the first bearing surface, the at least one strut and the first bearing surface adapted to a geometry of the first interior component holder and configured to fix the first interior component holder therebetween.

9. The holder according to claim 8, wherein the at least one strut comprises, at an end directed away from the interface element, a guiding face inclined relative to the first bearing surface with the guiding face at a greater distance from the first bearing surface in a region directed away from the interface element than in a region directed towards the interface element.

10. A transporting apparatus for use on the mounting of an interior component in an aircraft, the transporting apparatus comprising:
    an undercarriage, and
    an interior component carrier unit supported on the undercarriage, wherein at least one holder according to claim 1 for fastening an interior component to the transporting apparatus is fastened to the interior component carrier unit.

* * * * *

UNITED STATES PATENT AND TRADEMARK OFFICE
CERTIFICATE OF CORRECTION

| | | |
|---|---|---|
| PATENT NO. | : 8,528,887 B2 | |
| APPLICATION NO. | : 12/790277 | |
| DATED | : September 10, 2013 | |
| INVENTOR(S) | : Humfeldt et al. | |

It is certified that error appears in the above-identified patent and that said Letters Patent is hereby corrected as shown below:

On the title page, the assignee name reading "Airbus Deutschland GmbH" should read --"Airbus Operations GmbH"--.

Signed and Sealed this
Ninth Day of December, 2014

Michelle K. Lee
*Deputy Director of the United States Patent and Trademark Office*